United States Patent Office 2,846,480
Patented Aug. 5, 1958

2,846,480

CHLOROMETHYLATION

Gifford G. McClaflin and Edsel L. Miller, Ponca City, Okla., assignors to Continental Oil Company, Ponca City, Okla., a corporation of Delaware No Drawing. Application May 17, 1954
Serial No. 430,414

14 Claims. (Cl. 260—651)

This invention relates to a process for the manufacture of alkaryl chloromethyl compounds.

As is well known to those familiar with the art, aromatic and alkaryl hydrocarbons have been chloromethylated by treatment with formaldehyde and hydrochloric acid; paraformaldehyde, zinc chloride, and hydrogen chloride; or paraformaldehyde, concentrated sulfuric acid, and hydrogen chloride. When paraformaldehyde was used in accordance to prior art processes in the preparation of dichloromethyl compounds, a large excess of hydrogen chloride was employed resulting in a mixture of the hydrogen chloride, the monochloromethyl compound, and the dichloromethyl compound. Another method of chloromethylating an alkylbenzene is that taught by H. R. Raterink in U. S. Patent 2,630,459 using a primary alcohol, formaldehyde, and chlorosulfonic acid. In addition to the catalysts listed above, phosphoric acid, aluminum chloride, and stannic chloride have been used. Various other processes teach the use of solvents as, for example, naphtha, acetic acid, and carbon disulfide. As a general rule the ease of chloromethylation of aromatic compounds varies with the particular compound. Some aromatic compounds are easily chloromethylated even in the absence of a catalyst. Other aromatic compounds require the use of an active catalyst and/or elevated temperatures. High temperatures are objectionable because under such conditions the reaction is accompanied by charring, resulting in a dark product. In addition to the formation of a dark product, high temperatures are favorable to the formation of diphenylmethane derivatives and/or dichloromethylation products.

It is, therefore, a principal object of the present invention to provide an efficient process for the chloromethylation of alkyl aromatic compounds. It is another object of our invention to provide a process for the preparation of alkaryl chloromethyl compounds in a direct manner which can be carried out using relatively inexpensive equipment. Other objects and advantages of the present invention will become apparent to those skilled in the art as the invention is more fully described.

To the accomplishment of the foregoing and related ends, the invention then consists of the means hereinafter fully described and particularly pointed out in the claims, the following description setting forth in detail certain approved combinations of ingredients embodying our invention, such disclosed means constituting, however, but one of various forms in which the principle of the invention may be used.

Broadly stated, the invention may be described as a process of chloromethylating alkyl benzenes in which the alkyl benzene is allowed to react with a reagent formed by reacting formaldehyde or a compound which engenders formaldehyde with a chlorine-containing compound which will engender hydrogen chloride in the presence of an alcohol and sulfuric acid.

Before proceeding with specific examples illustrating our invention, it may be well to indicate in general the nature of the materials required in the process.

Suitable chlorine-containing compounds which will engender hydrogen chloride under the conditions used herein include phosphorus trichloride, phosphorus pentachloride, sulfuric oxychloride, sulfurous oxychloride, and acyl chlorides such as acetyl chloride.

Formaldehyde engendering compounds which may be used include paraformaldehyde either in the form of powder or flakes, alcoholic solutions of formaldehyde, trioxane and gaseous formaldehyde.

Any alkyl aromatic hydrocarbons having an active hydrogen on the aromatic nucleus may be easily chloromethylated by our process. Typical hydrocarbons are alkyl aromatic hydrocarbons having from 1 to more than 24 carbon atoms in the side chain which may be either straight or branched. Specific compounds include toluene, xylenes, cumene, ethyl benzene, propyl benzene, dodecylbenzene, dodecyltoluene, and pentadecylbenzene. In addition, aromatic halogen compounds may be chloromethylated by our process. Other examples include aromatic ethers, thio ethers, aldehydes, ketones, phenols, acids, esters, and nitro compounds.

Suitable alcohols include almost any liquid saturated primary alcohol which may be either monohydric or polyhydric. Although in general water soluble alcohols are preferred, water solubility is not essential. Specific alcohols include methanol, ethanol, normal propanol, normal butanol, and ethylene glycol.

The molar ratio of materials used in the chloromethylation reaction may be varied from about 1:1:1:1:0.33 to about 1:2:2:2.5:1 but a ratio of about 1:1.6:1.6:2.1:-0.5 is very satisfactory for aromatic compound: formaldehyde: alcohol: sulfuric acid: chlorine-containing compound, respectively.

The chloromethylating reagent may be prepared by reacting formaldehyde or compounds which will engender formaldehyde with an alcohol and a chlorine-containing compound as, for example, phosphorus trichloride in the presence of sulfuric acid at a temperature within the range of $-20°$ C. to $60°$ C.; preferably 15 to $20°$ C. During the reaction the temperature is maintained within the preferred range, namely, below $30°$ C. After the formation of the reagent the alkyl aromatic hydrocarbon is added.

In view of the fact that the particular reactants used may be selected from a large list and since the best operating temperature depends largely upon the specific reactants used, the temperature employed in the chloromethylation step may vary from about $-10°$ C. to about $100°$ C. Generally, we prefer to operate within a temperature range of from about 50 to about $60°$ C. when an alkyl aromatic hydrocarbon having an alkyl group of from 9 to 15 carbon atoms is chloromethylated. It is to be understood, however, that higher or lower temperatures may be used with a resultant increase or decrease in reaction rate in accordance with the general law of chemical reactions.

Temperature and the relative quantity of sulfuric acid of a definite concentration are dependent. If the proportion of sulfuric acid is increased the chloromethylation temperature should be decreased. When aromatic compounds which are more easily chloromethylated than alkyl aromatic hydrocarbons having an alkyl group of from about 9 to about 15 carbon atoms are used, either the proportion of sulfuric acid or the temperature should be decreased to avoid formation of diphenylmethane and dichloromethylation products. Conversely for those aromatic compounds which are less readily chloromethylated the proportion of sulfuric acid or the temperature should be increased in order to obtain good yields of desired product. For still more difficulty chloromethylated aromatic compounds the ratio of reagent to aromatic compound may be increased. Thus, by adjusting the proportion of sulfuric acid and the temperature of the reaction, aromatic compounds varying in ease of chloromethylation from very readily to difficultly chloromethylated may be chloromethylated in good yields with little if any diphenylmethane and dichloromethylation products. As to the concentration of the sulfuric acid used that may vary from about 90 to about 110 per cent sulfuric acid; for convenience, however, we prefer 100 percent sulfuric acid. If the concentration is below 90 percent the yield of the desired product is low, if the concentration exceeds 110 percent great care must be exercised in the amount of acid used.

In order to disclose the nature of the present invention still more clearly, the following illustrative examples will be given in which parts are parts by weight.

Example 1

36 parts of paraformaldehyde was added to 38 parts of methyl alcohol and the resulting mixture was added to a Pfaudler reaction vessel equipped with an agitator, a condenser for reflux purposes, and a hydrogen chloride absorption trap. After cooling the methanolic paraformaldehyde mixture to 5° C., 55 parts of phosphorus trichloride was added over a period of 20 minutes and then 146 parts of 100 percent sulfuric acid and 246 parts of dodecylbenzene having a boiling point of from 145 to 205° C. at a pressure of 20 mm. of mercury was added rapidly. During this period the temperature was maintained below 30° C. The resulting mixture was then heated to 50° C. and maintained within the range of 35 to 60° C. for a period of 2 hours. At the end of this period the mixture was cooled, allowed to settle into two phases, an upper and lower phase. The lower phase was withdrawn and discarded. The upper phase was washed with hot water and then with a dilute aqueous sodium bicarbonate solution and then finally dried over sodium sulfate. After filtering there was obtained 285 parts of a clear bright yellow liquid product analyzing 10.5 percent chlorine. 30 parts of the foregoing product was converted to the quaternary ammonium compound by heating with 16 parts of isopropyl alcohol and 22 parts of triethylamine. On extraction with petroleum ether there was obtained from the reaction mixture approximately 4 parts of recovered dodecylbenzene.

Example 2

Example 1 was repeated with the exception that 200 parts of dodecylbenzene was used instead of 246 parts. There was obtained 230 parts of clear bright pale yellow product which analyzed 11.53 percent chlorine and with triethylamine yielded a quaternary product which dissolved in water to a clear bright solution.

Example 3

Example 2 was repeated with the exception that 200 parts of dodecyltoluene was used in place of 246 parts of dodecylbenzene. There was obtained 230 parts of clear bright pale yellow product analyzing 10.86 percent chlorine.

Example 4

Example 2 was repeated with the exception that 94 parts of acetyl chloride was used in place of 55 parts of phosphorus trichloride. About 235 parts of a bright yellow liquid product analyzing 12.0 percent chlorine was obtained.

Example 5

Example 2 was repeated with the exception that the reaction was carried out in a closed vessel to prevent the escape of HCl. There was obtained a yield of 240 parts of clear bright pale yellow liquid product which analyzed 12.0 percent chlorine and by reacting it with triethylamine it yielded a quaternary which dissolved in water to a clear bright solution from which only traces of unreacted dodecylbenzene could be extracted.

Example 6

Example 2 was repeated with the exception that 166 parts of nonylbenzene was used in place of 200 parts of dodecylbenzene. The reaction proceeded as readily and was as easily controlled as in the preceding examples. There was obtained 208 parts of nonylbenzylchloride which analyzed 13.5 percent chlorine.

Example 7

Example 2 was repeated with the exception that 325 parts of a material boiling about 205 to 230° C. at 20 mm. pressure obtained by alkylating benzene with dodecene was used in place of 200 parts of dodecylbenzene. The reaction proceeded as readily and was as easily controlled as in the preceding examples. There was obtained 359 parts of product analyzing 7.40 percent chlorine.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A process of chloromethylating alkylbenzenes which comprises reacting at a temperature within the range of from —10 to 100° C., 1 mole of an alkylbenzene with 1 to 2½ moles of sulfuric acid and a re-agent prepared by reacting at a temperature within the range of from —20 to 60° C., (a) a compound selected from the class consisting of formaldehyde and compounds which engender formaldehyde wherein the amount of said compound is equivalent to 1 to 2 moles of formaldehyde, (b) 1 to 2 moles of a primary monatomic saturated aliphatic alcohol containing from 1 to 4 carbon atoms, (c) 0.33 to 1 mole of a chlorine-containing compound selected from the class consisting of phosphorus trichloride, phosphorus pentachloride, sulfuric oxychloride, sulfurous oxychloride, and acyl chlorides.

2. The process of claim 1 wherein the chlorine-containing compound is phosphorus trichloride.

3. The process of claim 1 wherein the chlorine-containing compound is phosphorus pentachloride.

4. The process of claim 1 wherein the chlorine-containing compound is sulfuric oxychloride.

5. The process of claim 1 wherein the chlorine-containing compound is sulfurous oxychloride.

6. The process of claim 1 wherein the chlorine-containing compound is acetyl chloride.

7. The process of claim 1 wherein the formaldehyde engendering compound is paraformaldehyde.

8. The process of claim 1 wherein the formaldehyde engendering compound is an alcoholic solution of formaldehyde.

9. The process of claim 1 wherein the formaldehyde engendering compound is trioxane.

10. The process of claim 1 wherein the formaldehyde engendering compound is gaseous formaldehyde.

11. The process of claim 1 wherein the alcohol is methanol.

12. The process of claim 1 wherein the alcohol is ethanol.

13. The process of claim 1 wherein the alcohol is propanol.

14. The process of claim 1 wherein the alcohol is butanol.

References Cited in the file of this patent

UNITED STATES PATENTS 2,630,459    Raterink _____ Mar. 3, 1953